United States Patent
Lasson et al.

(10) Patent No.: US 12,407,053 B2
(45) Date of Patent: Sep. 2, 2025

(54) BATTERY MODULE FOR A MOTOR VEHICLE

(71) Applicant: PLASTIC OMNIUM CLEAN ENERGY SYSTEMS RESEARCH, Lyons (FR)

(72) Inventors: Rémi Lasson, Brussels (BE); Nicolas Derangere, Brussels (BE); Cosmin Barsan, Brussels (BE)

(73) Assignee: PLASTIC OMNIUM CLEAN ENERGY SYSTEMS RESEARCH, Lyons (FR)

( * ) Notice: Subject to any disclaimer, the term of this patent is extended or adjusted under 35 U.S.C. 154(b) by 0 days.

(21) Appl. No.: 18/857,648

(22) PCT Filed: Apr. 21, 2023

(86) PCT No.: PCT/EP2023/060401
§ 371 (c)(1),
(2) Date: Oct. 17, 2024

(87) PCT Pub. No.: WO2023/203184
PCT Pub. Date: Oct. 26, 2023

(65) Prior Publication Data
US 2025/0125469 A1    Apr. 17, 2025

(30) Foreign Application Priority Data

Apr. 22, 2022 (FR) ........................ 2203768

(51) Int. Cl.
*H01M 50/249* (2021.01)
*H01M 10/42* (2006.01)
(Continued)

(52) U.S. Cl.
CPC ....... *H01M 50/249* (2021.01); *H01M 10/482* (2013.01); *H01M 10/6567* (2015.04); *H01M 10/425* (2013.01); *H01M 2010/4271* (2013.01)

(58) Field of Classification Search
CPC .. H01M 10/42; H01M 10/48; H01M 10/4228; H01M 10/6567; H01M 10/425;
(Continued)

(56) References Cited

U.S. PATENT DOCUMENTS

| | | |
|---|---|---|
| 2011/0262793 A1 | 10/2011 | Reis et al. |
| 2012/0003515 A1 | 1/2012 | Eisenhour |

(Continued)

FOREIGN PATENT DOCUMENTS

| | | |
|---|---|---|
| CN | 102282718 A | 12/2011 |
| CN | 202550023 U | 11/2012 |

(Continued)

OTHER PUBLICATIONS

International Search Report & Written Opinion issued Sep. 19, 2023 in PCT/EP2023/060401 filed Apr. 21, 2023, 12 pages.

(Continued)

*Primary Examiner* — Miriam Stagg
*Assistant Examiner* — Lilia Nedialkova
(74) *Attorney, Agent, or Firm* — Oblon, McClelland, Maier & Neustadt, L.L.P.

(57) ABSTRACT

The invention relates to a battery module having a housing enclosing electrical energy storage cells and a device for monitoring a characteristic of the fluid contained in the housing of the module other than the temperature in order to diagnose the deterioration of at least one of the electrical energy storage cells enclosed in the housing of the module.

13 Claims, 1 Drawing Sheet

(51) Int. Cl.
*H01M 10/48* (2006.01)
*H01M 10/6567* (2014.01)

(58) Field of Classification Search
CPC ........... H01M 10/482; H01M 10/6569; H01M 2200/00; H01M 50/249; H01M 2010/4271; Y02E 60/10
See application file for complete search history.

(56) References Cited

U.S. PATENT DOCUMENTS

| | | | | |
|---|---|---|---|---|
| 2013/0181826 | A1* | 7/2013 | Yang | H01M 50/271 |
| | | | | 340/455 |
| 2014/0038006 | A1* | 2/2014 | Sturm | H01M 10/4235 |
| | | | | 429/61 |
| 2015/0303723 | A1* | 10/2015 | Raghavan | G01N 21/7703 |
| | | | | 73/19.01 |
| 2017/0125860 | A1 | 5/2017 | Chatroux et al. | |
| 2018/0003685 | A1* | 1/2018 | Cummings | H01M 10/4228 |
| 2022/0085428 | A1* | 3/2022 | Engle | H01M 10/443 |

FOREIGN PATENT DOCUMENTS

| | | |
|---|---|---|
| DE | 10 2020 109 269 A1 | 10/2021 |
| EP | 3 166 175 A1 | 5/2017 |
| EP | 3 910 349 A1 | 11/2021 |
| FR | 3 112 028 A1 | 12/2021 |
| JP | 2014-512004 A | 5/2014 |
| JP | 2021-128882 A | 9/2021 |
| WO | WO 2021/001108 A1 | 1/2021 |

OTHER PUBLICATIONS

Zhenghai, et al., "A survey of methods for monitoring and detecting thermal runaway of lithium-ion batteries", Journal of Power Sources, Elsevier, Amsterdam, NL, vol. 436, 2019, 19 pages.
Japanese Office Action dated May 20, 2025, issued in Japanese Patent Application No. 2024-562129 (with English translation).
Chinese Office Action dated Jun. 21, 2025, issued in Chinese Patent Application No. 202380032040.1 (with English translation).
"Dynamic testing method and technology of particle cloud concentration" published on Oct. 2021.
"Micro-Electro-Mechanical Systems and their related technologies" published on Jul. 2001.

* cited by examiner

BATTERY MODULE FOR A MOTOR VEHICLE

TECHNICAL FIELD OF THE INVENTION

The invention relates to the field of batteries and, more specifically, battery modules for a motor vehicle.

BACKGROUND ART

Motor vehicles increasingly need electrical energy storage capacity, not least because of the anti-pollution standards imposed by local legislation. While the use of a battery enables an electric motor to replace all or part of a combustion engine and the pollution associated with its combustion, it does not replace the engine under the same usage conditions.

One major drawback is the risk of thermal runaway of the electrical energy storage cells, particularly in the case of lithium-ion batteries. In concrete terms, if the temperature rises too high, a chain reaction inside the electrical energy storage cell eventually vaporizes the electrolyte, leading to an internal overpressure in the electrical energy storage cell. In the most severe cases, several or even all of the electrical energy storage cells are subjected to thermal runaway, which can lead to a fire in the battery and, incidentally, in the components surrounding the battery, that is, all or part of the motor vehicle where the battery is fitted.

This drawback has already been raised in documents WO 2021/001108, EP 3 910 349, DE 10 2020 109269, FR 3 112 028, US 2012/003515, EP 3 166 175 and the article "A survey of methods for monitoring and detecting thermal runaway of lithium-ion batteries", journal of power sources, Elsevier edition, vol. 436, Jul. 20, 2019, ISSN: 0378-7753.

What is more, the higher the battery's current consumption, the greater the power discharged by the battery (with the Joule effect increasing with the square of the discharge current), and the greater the incentive for the user to use a fast-charge terminal (with the Joule effect increasing with the square of the charge current), making the risk of thermal runaway even more frequent.

As a result, battery thermal regulation is becoming a major challenge for motor vehicles designed to meet ever more stringent pollution standards.

SUMMARY OF THE INVENTION

One of the aims of the invention is to provide a battery module capable of detecting, at an early stage, the risk of thermal runaway of the electrical energy storage cells contained in the battery module.

To this end, the invention relates to a battery module for a motor vehicle comprising a housing enclosing electrical energy storage cells, characterized in that the battery module comprises a device for monitoring a characteristic of a fluid contained in the housing of the module in order to diagnose the deterioration of at least one of the electrical energy storage cells enclosed in the housing of the module), in that the monitoring device comprises at least one detection element mounted on the housing of the module and intended to determine the presence of a pollution fluid escaping from at least one of the electrical energy storage cells different from the fluid contained in the housing of the module, and in that the detection element comprises an electrical conductivity sensor for measuring a variation in electrical conductivity in the fluid contained in the housing of the module generated by the pollution fluid escaping from at least one of the electrical energy storage cells.

According to the invention, the battery is made up of several modules electrically connected in parallel or in series, which has several advantages. Firstly, it is easier to thermally regulate several battery modules than a single volume comprising the same number of electrical energy storage cells. It is also simpler to install several battery modules in the vehicle than a single volume comprising the same number of electrical energy storage cells. Finally, it is simpler to be able to change a module with faulty electrical energy storage cells than to change the whole battery for only a small proportion of failed electrical energy storage cells. As a result, the monitoring device's diagnostics will enable any faulty electrical energy storage cells to be checked quickly, with prior knowledge of the battery module to be checked.

Additionally, according to the invention, each module can detect the deterioration of at least one of its electrical energy storage cells in order to stop the thermal runaway of the battery as soon as possible. The obvious solution to a thermal runaway problem would be to monitor the temperature of the electrical energy storage cells. However, this is not the solution adopted by the invention, as the temperature rise actually takes place very shortly before the fire.

Thus, it has been found that in order to prevent deformation of each electrical energy storage cell and hence damage to the components surrounding the electrical energy storage cell, an exhaust valve is generally provided, often consisting of a frangible part designed to break at a predetermined internal pressure, allowing the excess pressure to escape to the outside of the electrical energy storage cell. Once the exhaust valve is opened, the electrical energy storage cell is therefore no longer functional.

The invention therefore takes advantage of this observation not to track the temperature of each electrical energy storage cell, but to monitor at least one characteristic other than the temperature of the fluid present in the battery module, such as the electrical conductivity and, optionally in addition, the composition, pressure or transparency, to determine whether a pollution fluid such as a gas has escaped from at least one of the module's electrical energy storage cells, in order to diagnose a possible thermal runaway as early as possible.

This is because it is costly and complex to fit a temperature sensor on each electrical energy storage cell, and the single temperature sensor in the housing does not enable thermal runaway of one of the electrical energy storage cells to be detected reliably and early enough. In a different way, according to the invention, an anomaly is detected after the destruction of at least one of the electrical energy storage cells. Thus, thermal runaway is localized immediately among the battery modules and early enough (notably earlier than by temperature monitoring) to prevent it from spreading to other electrical energy storage cells in the battery module and/or to other battery modules. Finally, advantageously according to the invention, the monitoring device is compatible with a wide variety of types of thermal regulation systems.

Advantageously, according to the invention, the detection element can be mounted either inside or outside the housing of each module, depending on the layout or type of battery. Of course, several identical (same detected characteristic of the fluid present in the battery module) and/or different (several different detected characteristics of the fluid present in the battery module) detection elements can be present on the same module to improve diagnostics.

An electrical conductivity sensor is preferred because it is more reliable at detecting its characteristic in the fluid with respect to other characteristics. As a result, it is less sensitive to other fluid characteristics (e.g. color, transparency, etc.) that could interfere with/modify characteristic measurements. In other words, an electrical conductivity sensor provides fewer false measurements than other types of sensor in the context of the invention.

Advantageously according to the invention, as soon as a variation in the conductivity (or conversely the resistivity) of the fluid in the module is outside predetermined thresholds (such as the average conductivity of other battery modules, a deviation from normal conductivity at a given temperature or a deviation from a predetermined conductivity), the monitoring device can diagnose a possible thermal runaway.

Advantageously according to the invention, in the particular case where the fluid is air, an electrical conductivity sensor can also detect an increase in the humidity level in the air, which can lead to a short-circuit (air breakdown) that generally precedes thermal runaway. In other words, an electrical conductivity sensor not only diagnoses thermal runaway, but can also prevent it. No other type of sensor, such as a temperature or pressure sensor, can do this.

The invention may also comprise one or more of the following optional features, taken alone or in combination.

The detection element can further comprise a concentration sensor to measure the concentration of pollution fluid escaping from at least one of the electrical energy storage cells in the fluid contained in the housing of the module. This means that as soon as a tiny proportion of pollution fluid is present, the monitoring device can diagnose a possible thermal runaway.

The detection element can further comprise a pressure sensor to measure a pressure variation in the fluid contained in the housing of each module generated by the pollution fluid escaping from at least one of the electrical energy storage cells. Advantageously according to the invention, as soon as a variation in the fluid pressure in the module is above a predetermined threshold (such as the average pressure of the other battery modules, a deviation from a normal pressure at a given temperature or a deviation from a predetermined pressure), the monitoring device can diagnose a possible thermal runaway.

The detection element can further comprise an optical sensor to measure a light transmission variation in the fluid contained in the housing of each module generated by the pollution fluid escaping from at least one of the electrical energy storage cells. Advantageously according to the invention, as soon as a variation in fluid brightness in the module is outside predetermined thresholds (such as the average brightness of other battery modules or a deviation from a predetermined brightness), the monitoring device can diagnose a possible thermal runaway. It is worth noting that the latter type of sensor allows for additional detection. Thus, if a fire starts in the module, the monitoring device will be able to detect smoke by the decrease in brightness or, on the contrary, flames by the increase in brightness. Additionally, in the event of liquid fluid in the module, the monitoring device will be able to detect gas bubbles escaping from electrical energy storage cells by the variation in brightness.

The monitoring device can comprise at least one guide element mounted on the housing of the module and designed to divert the pollution fluid escaping from at least one of the electrical energy storage cells toward the detection element in order to make detection more reliable and limit the number of detection elements. It is understood that the guide element can form part of the upper cover of the housing of each module to impose a passage of the pollution fluid in front of each detection element. The guide element can thus form a collector forcing all pollution fluids to pass in front of each detection element.

The fluid contained in the housing of the module may be air in a gaseous phase or a dielectric heat transfer fluid in a liquid phase designed to thermally regulate at least some of the electrical energy storage cells comprised in the battery module.

Another object of the invention is a thermal regulation system for a motor vehicle battery module as described above, characterized in that the regulation system comprises a control unit electrically connected to the fluid monitoring device contained in the housing of the module in order to selectively control the operation of the thermal regulation system based on the diagnosed deterioration of at least one of the electrical energy storage cells enclosed in the housing of the module.

Finally, the invention relates to a motor vehicle characterized in that it comprises a thermal regulation system as described above.

BRIEF DESCRIPTION OF THE FIGURES

Other features and advantages of the invention will become apparent from the description given below, by way of indication and in no way limiting, with reference to the accompanying drawings, wherein.

DETAILED DESCRIPTION

Figure 1:
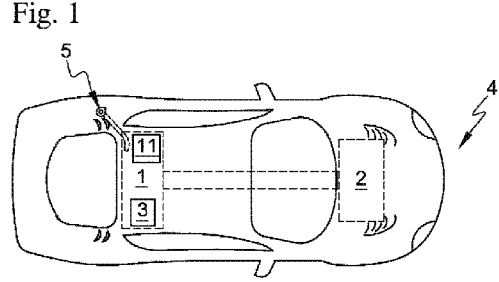
FIG. 1 is a schematic top view of an example vehicle wherein a thermal regulation system for a battery module according to the invention is mounted.

In the following, the orientations are the orientations of the figures. In particular, the terms "upper", "lower", "left", "right", "above", "below", "forward" and "backward" are generally understood relative to the direction of representation of the figures.

The invention applies to any type of battery 3 thermal regulation system 1, in particular those designed to equip a motor vehicle 4 such as a passenger car, SUV ("Sport Utility Vehicles"), two-wheeler (especially motorcycles), aircraft, industrial vehicles chosen from vans, "heavy goods vehicles"—that is, subways, buses, road transport vehicles (trucks, tractors, trailers), off-road vehicles such as agricultural or civil engineering machinery—, or other transport or handling vehicles.

The motor vehicle 4 can be of the electric type, that is, with at least one electric motor powered by at least one battery, of the hybrid type, that is, with at least one internal combustion engine powered by at least one fuel (gasoline, liquefied petroleum gas, diesel, natural gas for vehicles, bio-fuel such as ethanol obtained from plant matter, etc.) and assisted by at least one electric motor powered by at least one battery and/or by the on-board network of the motor vehicle 4, of the fuel cell type, that is, with at least one electric motor powered by at least one battery and/or by a fuel cell powered by dihydrogen (such as that coming from a pressurized tank) and dioxygen (such as that coming from the ambient air), or of the rechargeable hybrid type, that is, with at least one internal combustion engine powered by at least one fuel (gasoline, liquefied petroleum gas, diesel, natural gas for vehicles, biofuel such as ethanol obtained from plant matter, etc.) and at least one electric motor powered by the on-board network of the motor vehicle 4 and/or at least one battery rechargeable by connection to an electrical network external to the motor vehicle 4. Of course, the invention is not limited to the above examples of 4-wheel drive vehicles, but can be applied to any type of 4-wheel drive vehicle incorporating at least one battery without departing from the scope of the invention.

The term "thermal regulation system 1" refers to all types of system 1 used to control the flow, temperature and pressure of a heat transfer fluid designed, by moving said heat transfer fluid around some of the electrical energy storage cells 9 of a battery 3 (exchange by immersion in a dielectric heat transfer fluid, exchange by pulsed air, exchange by air-exchanger), to thermally exchange with all or some of the electrical energy storage cells 9 in order to control its temperature, that is, typically to heat and/or cool, according to a predetermined control, all or some of the electrical energy storage cells 9 present in at least one battery 3 module 7.

"Heat transfer fluid" refers to a fluid in the thermal regulation system 1 that enables contact exchange of cold and/or heat from at least some of the electrical energy storage cells 9 in a battery 3. Typically, the heat transfer fluid can be circulated around all or part of the electrical energy storage cells 9 by at least partially filling a battery 3 module 7.

"Dielectric heat transfer fluid" refers to a fluid intended to remain in liquid form in the battery 3 module 7 of the thermal regulation system 1, in order to exchange, by contact, the cold and/or heat of at least some of the electrical energy storage cells 9 of a battery 3. Typically, the dielectric heat transfer fluid is single-phase, that is, it will not change phase (will remain liquid) within the temperature range considered in normal operation such as, for example, between −40° C. and 60° C. According to the invention, the heat transfer fluid is dielectric, that is, preferentially has an electrical resistivity $\rho$ at least equal to $1 \cdot 10^9$ ohm meters (1 G$\Omega$·m) at a temperature of 300 kelvins (300 K) or, conversely, an electrical conductivity $\sigma$ at most equal to $1 \cdot 10^{-9}$ siemens per meter (1 nS·m$^{-1}$) at a temperature of 300 kelvins (300 K), so as not to disturb the electrical connections in particular between the cells 9 present in the same battery 3 module 7. This type of dielectric heat transfer fluid can be similar to those used for electrical transformers. It will therefore not be described further in the present description, since it is known per se. By way of example, the dielectric heat transfer fluid can be a Novec® 7500 type product sold by 3M®, a F18 or F20 type product sold by Total® or a DF7 or DFK type product sold by MiVolt®.

"Fluid characteristic" refers to a physico-chemical characteristic of the fluid, not the mass or volume of the fluid.

"Electrical energy storage cell 9" refers to all types of electrochemical accumulators capable of storing electrical energy and, in a reversible manner, releasing the stored electrical energy.

"Battery 3 module 7" refers to a housing 8 containing at least two electrical energy storage cells 9 electrically connected in series or parallel. In the context of the invention, a heat transfer fluid is circulated in at least one battery 3 module 7 in order to thermally regulate at least some of the electrical energy storage cells 9 received in the battery 3 module 7.

"Battery 3" refers to all the modules 7 electrically connected in series or parallel and, incidentally, all the electrical energy storage cells 9 included in the modules 7.

"Powertrain 2" refers to the assembly comprising the engine(s) designed to directly or indirectly drive the wheels of the motor vehicle 4, as well as the accessories for each engine such as, for example, the alternator, the cooling system, the gearbox or the lubrication system.

In the example shown in FIG. 1, a thermal regulation system 1 for a battery 3 is fitted in a motor vehicle 4. In this example, an electrical connection element 5 is provided on the bodywork of the motor vehicle 4 to enable recharging of the battery 3. As explained above, the thermal regulation system 1 and/or the battery 3 can be fluidically and/or electrically connected to the powertrain 2. Advantageously, according to the invention, all the technical features and effects of the thermal regulation system 1 guarantee optimum operation of the electrical energy exchanges between the battery 3 and the components of the motor vehicle 4, for example, while the motor vehicle is in motion or when recharging with electrical energy while the motor vehicle is parked.

According to the invention, the thermal regulation system 1 can be of several types. The heat transfer fluid contained in the housing 8 of the module 7 may be air in a gaseous phase or a dielectric heat transfer fluid in a liquid phase designed to thermally regulate at least some of the electrical energy storage cells 9 comprised in the battery 3 module 7. The battery 3 modules 7 also enable the electrical connection of the electrical energy storage cells 9 to the rest of the motor vehicle 4 to guarantee its electrical energy supply. These electrical connections are made by waterproof connectors. The battery 3 modules 7 each comprise a housing 8 consisting of a lower recessed base 8b (accommodating the electrical energy storage cells 9) sealed by an upper cover 8a to provide protection for the electrical energy storage cells 9 against mechanical incidents (crash, mechanical shocks, etc.) as well as protection in the event of fire (limits the progress of flames outside each battery 3 module 7 so that they do not reach the electrical energy storage cells 9).

According to the invention, the regulation system 1 comprises a control unit 11 electrically connected to a device 19 for monitoring the fluid contained in the housing 8 of the battery 3 module 7 in order to selectively pilot the operation of the thermal regulation system 1 based on the diagnosed deterioration of at least one of the electrical energy storage cells 9 enclosed in the housing 8.

Figure 2:
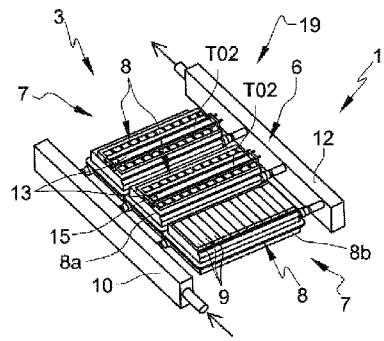
FIG. 2 is a schematic perspective view of an example battery module according to a first embodiment of the invention.

In the example shown in FIG. 2 presenting a first embodiment of the invention, the regulation system 1 can be of the type with immersion of the electrical energy storage cells 9, that is, each battery 3 module 7 comprises a housing 8 enclosing electrical energy storage cells 9 in dielectric heat transfer fluid. Preferentially, the electrical energy storage cells 9 of each battery 3 module 7 are fully immersed in dielectric heat transfer fluid forming part of a fluidic network 6. Preferentially, several battery 3 modules 7 are fluidically connected to the rest of the fluidic network 6 by fluidic connections to a common inlet manifold 10 and a common outlet manifold 12. In the example shown in FIG. 2, three battery 3 modules 7 are placed in parallel in the fluidic network 6 to enable an equitable and homogeneous supply of dielectric heat transfer fluid for each of the battery 3 modules 7, thus guaranteeing homogeneous thermal regulation of the electrical energy storage cells 9. This parallel arrangement also reduces pressure losses in the fluidic network 6. In order to homogenize the pressure drops in each of the connections of the battery 3 modules 7 (and therefore to have similar flow rates in each module), the fluidic connection section between the common inlet manifold 10 and its associated battery 3 module 7 is of different size depending on its distance from its connection to the fluidic network 6 in order to obtain an equivalent dielectric heat transfer fluid flow rate between the battery 3 modules 7.

Figure 3:
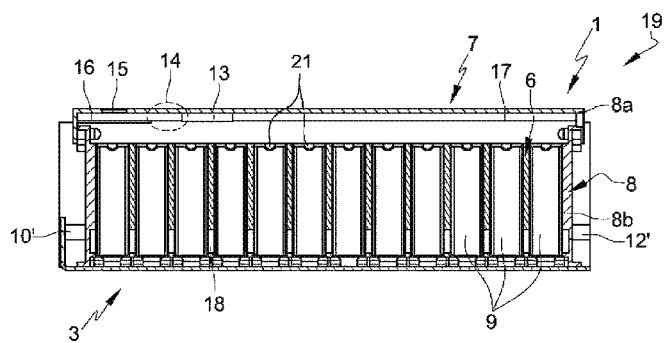
FIG. 3 is a schematic cross-sectional view of a battery module according to a second embodiment of the invention.

In the example shown in FIG. 3 presenting a second embodiment of the invention, the regulation system 1 can be of the type with heat exchanger 18 with the heat transfer fluid comprised around the electrical energy storage cells 9, that is, each battery 3 module 7 comprises a housing 8 enclosing electrical energy storage cells 9 and a heat exchanger 18. Preferentially, the electrical energy storage cells 9 of each battery 3 module 7 are therefore heated or cooled by the heat exchanger 18 forming part of a fluidic network 6 of the thermal regulation system 1 via the heat transfer fluid present in the housing 8. Preferentially, several battery 3 modules 7 are fluidically connected to the rest of the fluidic network 6 by hydraulic connections to a common inlet manifold 10 and a common outlet manifold 12. In the example shown in FIG. 3, the battery 3 modules 7 (only one in FIG. 3) are placed in parallel in the fluidic network 6 to enable an equitable and homogeneous supply of heat transfer fluid for each of the heat exchangers 18 of the battery 3 modules 7, thus guaranteeing homogeneous thermal regulation of the electrical energy storage cells 9. This parallel arrangement also reduces pressure losses in the fluidic network 6 between the inlet 10' and the outlet 12' of the heat exchanger 18 in the housing 8.

It will therefore be understood that the thermal regulation system 1 used in this invention enables the electrical energy storage cells 9 to be maintained at their optimum temperature, thus guaranteeing optimized (best energy efficiency) and robust (optimum charging and discharging for a longer service life) operation of the battery 3 whatever the external conditions wherein the motor vehicle 4 operates, that is, even if it is very cold or very hot.

In a simpler solution, no heat exchanger 18 is used and the heat transfer fluid, which may be air at ambient pressure, is drawn into the housing 8 and then blown out of the housing 8 by a fan (third embodiment not shown). It will be understood that in the latter case, the heating and cooling potential of the thermal regulation system 1 is much more limited than in the first two cases.

Typically, the immersion example of the first embodiment is more efficient for heat exchange, as the specific exchange surface is larger and evacuation from each battery module 7 3 by circulation of the dielectric heat transfer fluid is rapid, enabling high regulation efficiency and reactivity to satisfy both charging (in fast charge terminals) and discharging (electrical consumption of the vehicle 4 at high load) of the battery's high electrical power. Additionally, heat exchange is highly efficient, as it takes place directly by convection of the heat transfer fluid over the envelope of each electrical energy storage cell 9. By the same token, immersion regulation is also safer against the spread of any fire from the battery 3 in the motor vehicle 4.

Advantageously according to the invention, each battery 3 module 7 comprises a device 19 for monitoring a characteristic of the fluid contained in the housing 8 of the module 7 other than the temperature, in order to diagnose the deterioration of at least one of the electrical energy storage cells 9 enclosed in the housing 8.

According to the invention, the battery 3 is made up of several modules 7 electrically connected in parallel or in series, which has several advantages. Firstly, it is easier to thermally regulate several battery 3 modules 7 than a single volume comprising the same number of electrical energy storage cells 9. It is also simpler to install several battery 3 modules 7 in the vehicle 4 than a single volume comprising the same number of electrical energy storage cells 9. Finally, it is simpler to be able to change a battery 3 module 7 with faulty electrical energy storage cells 9 than to change the whole battery 3 for only a small proportion of failed electrical energy storage cells 9. As a result, the diagnostics of the monitoring device 19 will enable any faulty electrical energy storage cells 9 to be checked quickly, with prior knowledge of the battery 3 module 7 to be checked.

Additionally, advantageously according to the invention, each battery 3 module 7 can detect the deterioration of at least one of its electrical energy storage cells 9 in order to stop the thermal runaway of the battery 3 as soon as possible. The obvious solution to a thermal runaway problem would be to monitor the temperature of the electrical energy storage cells 9. However, this is not the solution adopted by the invention.

Thus, it has been found that in order to prevent deformation of each electrical energy storage cell 9 and hence damage to the components surrounding each electrical energy storage cell 9, an exhaust valve 21 is generally provided, often consisting of a frangible part designed to break at a predetermined internal pressure, allowing the excess pressure to escape to the outside of the electrical energy storage cell 9. Once the exhaust valve 21 is opened, the electrical energy storage cell 9 is therefore no longer functional.

The invention therefore takes advantage of this observation not to track the temperature of each electrical energy storage cell 9, but to monitor at least one characteristic other than the temperature of the fluid present in the battery 3 module 7, such as the electrical conductivity and, optionally in addition, the composition, pressure or transparency, to determine whether a fluid such as a gas has escaped from at least one of the electrical energy storage cells 9 of the battery 3 module 7, in order to diagnose a possible thermal runaway as early as possible. This is because it is costly and complex to fit a temperature sensor on each electrical energy storage cell 9, and the single temperature sensor in the housing 8 does not enable thermal runaway of one of the electrical energy storage cells 9 to be detected reliably and early enough. In a different way, according to the invention, an anomaly is detected after the destruction of at least one of the electrical energy storage cells 9. Thus, thermal runaway is localized immediately among the battery 3 modules 7 and early enough to prevent it from spreading to the other electrical energy storage cells 9 in the battery 3 module 7 and/or to the other battery 3 modules 7. Finally, advantageously according to the invention, the monitoring device 19 is compatible with a wide variety of types of thermal regulation systems 1 as explained above.

The monitoring device 19 comprises at least one detection element 13 mounted on the housing 8 of the module 7 and designed to determine the presence of a pollution fluid escaping from at least one of the electrical energy storage cells 9 different from the fluid contained in the housing 8 of the battery module 7. Advantageously according to the invention, the detection element 13 can be mounted either inside or outside the housing 8 depending on the layout or type of battery 3. Of course, several identical (same detected characteristic of the fluid present in the battery 3 module 7) and/or different (several different detected characteristics of the fluid present in the battery 3 module 7) detection elements 13 can be present on the same module 7 to improve diagnostics of the control unit 11.

According to the invention, the detection element 13 comprises at least one electrical conductivity sensor in order to measure a conductivity variation in the fluid contained in the housing 8 generated by the pollution fluid escaping from at least one of the electrical energy storage cells 9. Advantageously according to the invention, as soon as a variation in the conductivity (or conversely the resistivity) of the fluid in the battery 3 module 7 is outside predetermined thresholds (such as the average conductivity of other battery 3 modules 7, a deviation from normal conductivity at a given temperature or a deviation from a predetermined conductivity), the monitoring device 19 can diagnose a possible thermal runaway. By way of example, the electrical conductivity sensor can be an electrode sensor.

An electrical conductivity sensor is preferred because it is more reliable at detecting its characteristic in the fluid with respect to other characteristics. As a result, it is less sensitive to other fluid characteristics (e.g. color, transparency, etc.) that could interfere with/modify characteristic measurements. In other words, an electrical conductivity sensor provides fewer false measurements than other types of sensor in the context of the invention.

Additionally, in the particular case where the fluid is air, an electrical conductivity sensor can also detect an increase in the humidity level in the air, which can lead to a short-circuit (air breakdown) that generally precedes thermal runaway. In other words, an electrical conductivity sensor not only diagnoses thermal runaway, but can also prevent it. No other type of sensor, such as a temperature or pressure sensor, can do this.

According to a first alternative, the detection element 13 can further comprise a concentration sensor to measure the concentration of pollution fluid escaping from at least one of the electrical energy storage cells 9 in the fluid contained in the housing 8. It will therefore be understood that as soon as a tiny proportion is present, the monitoring device 19 can diagnose a possible thermal runaway.

According to a second alternative, the detection element 13 can further comprise a pressure sensor in order to measure a pressure variation in the fluid contained in the housing 8 generated by the pollution fluid escaping from at least one of the electrical energy storage cells 9. Advantageously according to the invention, as soon as a variation in the fluid pressure in the battery 3 module 7 is above a predetermined threshold (such as the average pressure of the other battery 3 modules 7, a deviation from a normal pressure at a given temperature or a deviation from a predetermined pressure such as the ambient pressure outside the housing 8), the monitoring device 19 can diagnose a possible thermal runaway.

According to a third alternative, the detection element 13 can further comprise an optical sensor to measure a light transmission variation in the fluid contained in the housing 8 generated by the pollution fluid escaping from at least one of the electrical energy storage cells 9. Advantageously according to the invention, as soon as a variation in fluid brightness in the battery 3 module 7 is outside predetermined thresholds (such as the average brightness of other battery 3 modules 7 or a deviation from a predetermined brightness), the monitoring device 19 can diagnose a possible thermal runaway. It is worth noting that the latter type of sensor allows for additional detection. Thus, if a fire starts in the battery module 7, the monitoring device 19 will be able to detect smoke by the decrease in brightness or, on the contrary, flames by the increase in brightness. Additionally, in the event of liquid phase dielectric heat transfer fluid in the battery 3 module 7, the monitoring device 19 will be able to detect gas bubbles escaping from electrical energy storage cells 9 by the variation in brightness.

Advantageously according to the invention, the monitoring device 19 can comprise at least one guide element 17 mounted on the housing 8 and designed to divert the pollution fluid escaping from at least one of the electrical energy storage cells 9 toward the detection element 13 in order to make detection more reliable and limit the number of detection elements 13. It is understood that the guide element 17 can form part of the upper cover 8a of the housing 8 to impose a passage of the pollution fluid in front of each detection element 13. The guide element 17 can thus form a collector forcing all pollution fluids to pass in front of each detection element 13.

In the example shown in FIG. 3, it can be seen that the guide element 17 can thus comprise a deflector 16 above part of the electrical energy storage cells 9 in order to force any pollution fluid generated by one of the electrical energy storage cells 9 to pass through the detection zone 14 of the detection element 13 before escaping toward the outlet 15.

Of course, the guide element 17 can also only force any pollution fluid generated by one of the electrical energy storage cells 9 to escape toward the outlet 15 in order to pass into a detection zone 14 of the detection element 13 positioned outside the housing 8 of the module 7, preferentially proximate to the outlet 15.

The invention is not limited to the embodiments and variants presented, and other embodiments and variants will become clearly apparent to the person skilled in the art. Thus, the various embodiments and variants can be combined with one another without departing from the scope of the invention. By no means restrictive, it is possible for another type of detection element 13 to be used to enable detection of a pollution fluid from one of the electrical energy storage cells 9 without going beyond the scope of the invention. In addition, a temperature sensing element T02 can be used, for example, to thermally weight a sensor such as a pressure sensor and/or an electrical conductivity sensor.

LIST OF REFERENCES

1—thermal regulation system
2—powertrain
3—battery
4—motor vehicle
5—electrical connection element
6—fluid network
7—battery module
8—battery module housing
8a—upper housing cover
8b—lower recessed housing base
9—electrical energy storage cells
10—common inlet manifold
10'—inlet
11—control unit
12—common outlet manifold
12'—outlet
13—detection element
14—detection zone
15—pollution fluid outlet
16—deflector
17—guide element
18—heat exchanger 19—monitoring device
21—exhaust valve
T02—module temperature sensing element

The invention claimed is:

1. A battery module for a motor vehicle comprising a housing enclosing electrical energy storage cells, wherein
the battery module comprises a device for monitoring a characteristic of a fluid contained in the housing of the module in order to diagnose deterioration of at least one of the electrical energy storage cells enclosed in the housing of the module,
the device for monitoring comprises at least one detection element mounted on the housing of the module and configured to determine a presence of a gaseous pollution fluid escaping from at least one of the electrical energy storage cells different from the fluid contained in the housing of the module, and
the detection element comprises an electrical conductivity sensor for measuring a variation in electrical conductivity of the fluid contained in the housing of the module including the gaseous pollution fluid escaping from at least one of the electrical energy storage cells.

2. The battery module according to claim 1, wherein the detection element further comprises a concentration sensor to measure a concentration of gaseous pollution fluid escaping from at least one of the electrical energy storage cells in the fluid contained in the housing of the module.

3. The battery module according to claim 1, wherein the detection element further comprises a pressure sensor to measure a pressure variation in the fluid contained in the housing of the module including the gaseous pollution fluid escaping from at least one of the electrical energy storage cells.

4. The battery module according to claim 1, wherein the detection element further comprises an optical sensor to measure a light transmission variation in the fluid contained in the housing of the module including the gaseous pollution fluid escaping from at least one of the electrical energy storage cells.

5. The battery module according to claim 1, wherein the monitoring device comprises at least one guide element mounted on the housing of the module and designed to divert the gaseous pollution fluid escaping from at least one of the electrical energy storage cells toward the detection element in order to make detection more reliable and limit a number of detection elements.

6. The battery module according to claim 5, wherein at least one guide element is formed as part of a cover of the housing of the module.

7. The battery module according to claim 5, wherein at least one guide element mounted is formed within the housing of the module.

8. The battery module according to claim 1, wherein the detection element is mounted inside the housing of the module.

9. The battery module according to claim 1, wherein the detection element is mounted outside the housing of the module.

10. The battery module according to claim 1, wherein the fluid contained in the housing of the module is air.

11. The battery module according to claim 1, wherein the fluid contained in the housing of the module is a liquid phase dielectric heat transfer fluid configured to thermally regulate at least some of the electrical energy storage cells comprised in the battery module.

12. A thermal regulation system for the battery module for a motor vehicle according to claim 1, wherein the thermal regulation system comprises a control unit electrically connected to the device for monitoring contained in the housing of the module in order to selectively control operation of the thermal regulation system based on a diagnosed deterioration of at least one of the electrical energy storage cells enclosed in the housing of the module.

13. A motor vehicle comprising the thermal regulation system according to claim 12.

* * * * *